United States Patent Office 3,320,125
Patented May 16, 1967

3,320,125
INHALATION AEROSOL COMPOSITION
Wayne M. Grim, Bucks County, Pa., assignor to Merck & Co., Inc., Rahway, N.J., a corporation of New Jersey
No Drawing. Filed Apr. 28, 1964, Ser. No. 363,278
6 Claims. (Cl. 167—54)

The present invention relates to aerosol compositions for use in inhalation therapy.

A purpose of the invention is to more effectively dissolve or disperse anti-inflammatory steroids, such as dexamethasone phosphate, and isoproterenol sulfate in an inhalation aerosol composition, whether these compounds are independent or whether they react to form a salt.

A further purpose is to avoid the need to use sorbitan trioleate in an aerosol composition, and thus avoid any possible toxicity from this compound on inhalation.

A further purpose is to permissibly avoid the presence of ethanol in an aerosol composition and thus eliminate any irritating effects on mucous membranes caused by ethanol, and any corrosion of metal parts to which it may contribute.

A further purpose is to optionally omit the need for including sodium sulfate in an aerosol composition.

Further purposes appear in the specification and in the claims.

Isoproterenol is a bronchodilator of the ephedrine type generally available on the market and having the chemical name α-(isopropylaminomethyl)protocatechuyl alcohol. According to Merck Index (7th edition 1960) it is available as d-isoproterenol sulfate (dihydrate) and l-isoproterenol sulfate (dihydrate), both of which are well known compounds. Isoproterenol sulfate is extensively used in aerosol compositions which are typically used as often as every few hours to eliminate discomfort due to upper respiratory tract congestion.

Dexamethasone is the pharmaceutical name for 9α-fluoro-16α-methylprednisolone. This is a well known anti-inflammatory steroid mentioned in Merck Index (7th edition 1960). Dexamethasone phosphate is described in U.S. Patent No. 2,939,873.

A combination of dexamethasone phosphate and isoproterenol sulfate has been extensively used with an aerosol vehicle. Other anti-inflammatory steriods that can be combined with isoproterenol sulfate in the novel aerosol compositions of this invention are:

Cortisol-21-succinate Na-salt
Cortisol 21-phosphate and Na-salt
6-α-methylprednisolone 21-succinate Na-salt
Prednisolone 21-succinate Na-salt
9α-fluorocortisol 21-phosphate
Cortisone 21-hemisuccinate
Cortisone 21-phosphate K and Na-salt
Prednisolone 21-phosphate Na-salt
Dexamethasone 21-hemisulfate Na-salt
Hydrocortisone 21-succinate Na-salt
9α-fluoro-16α-hydroxyprednisolone acetonide
  21-disodium phosphate
9α-fluoro-11β,17α,21-trihydroxy-16β-methyl-1,4-
  pregnadiene-3,20-dione 21-sodium phosphate.

The present invention is concerned with an improvement in compositions for use in aerosol compositions.

In prior practice, the vehicle for the aerosol composition is essentially one or a combination of halogenated methanes or ethanes containing fluorine, usually also with chlorine.

In the prior art it is common practice to use as an aerosol vehicle a mixture of dichlorodifluoromethane (Freon 12) and 1,2-dichloro-1,1,2,2-tetrafluoroethane (Freon 114). In order to make a satisfactory aerosol composition using dexamethasone phosphate and isoproterenol sulfate, it had been necessary to incorporate sorbitan trioleate (Span 85).

Like most oleaginous material, sorbitan trioleate may cause lipid pneumonia. From this standpoint, sorbitan trioleate may be undesirable for inhalation in an aerosol composition.

We have discovered that by inclusion of 5 to 50% by weight of the aerosol composition of trichlorofluoromethane (Freon 11) the need for including sorbitan trioleate is avoided and therefore can be eliminated.

It is possible by the composition of the invention to utilize an anti-inflammatory steroid, such as dexamethasone phosphate, and isoproterenol sulfate as separate ingredients or as a salt in finely divided form, without any need for inclusion of sorbitan trioleate.

Without limiting to any theory, it would appear that the explanation of the improved operation is as follows:

While dichlorodifluoromethane (Freon 12) and 1,2-dichloro-1,1,2,2-tetrafluoroethane have lower boiling points and therefore are very effective as aerosol vehicles, they are relatively poor dispersing media. Trichlorofluoromethane has a substantially higher boiling point, but has markedly superior dispersing properties for dexamethasone phosphate, isoproterenol sulfate and the salt which these compounds form.

Accordingly, the trichlorofluoromethane (Freon 11) if added in proportions of 5 to 50% by weight, greatly aids the dispersing properties. While it contributes also to the vehicle and evaporates with the vehicle, it is not primarily added for this purpose.

The effectiveness of trichlorofluoromethane (Freon 11) is so great that, where desired, ethanol can be eliminated from the composition, thus avoiding a component which is irritating to some people and which causes corrosion problems particularly where the spray device has aluminum parts. If it is desired to employ ethanol, however, up to 5% can be employed in the aerosol compositions, the preferred amount if used, being about 2%.

Sodium sulfate can optionally be used as a scavenger for removing moisture which would otherwise cause agglomeration of particles and reduction in sprayability, but satisfactory compositions can be made in accordance with the invention without use of sodium sulfate.

One of the great advantages of the composition of the invention is that it is more homogeneous and therefore more effective pharmaceutically. It also has longer storage life.

Dexamethasone phosphate is suitably used as the disodium salt. The other preferred anti-inflammatory steroids are suitably used in the salt form identified above and can be employed in any one of the following compositions in place of the dexamethasone phosphate in the preparation of stable, useful aerosol compositions. Dexamethasone phosphate is employed in the following examples only for illustrative purposes in order to avoid unnecessary repetition of details, and not for purpose of limitation. It will be understood that the essential novel feature is the effectiveness of trichlorofluoromethane as a dispersant for the anti-inflammatory steroid as well as for the isoproterenol sulfate in the preparation of a stable aerosol composition.

The concentration of the anti-inflammatory steroid, particularly dexamethasone phosphate, in the composition of the invention will suitably be in the range between 0.01 and 1% and preferably about 0.14%. The concentration of isoproterenol sulfate in the composition of the invention also will suitably be in the range between 0.01 and 1% and preferably about 0.14%.

EXAMPLE 1

Per 12.6 grams of product

Dexamethasone phosphate (present as the disodium salt) ___mg__ 18
Isoproterenol sulfate ___mg__ 18
Trichlorofluoromethane (Freon 11) percent by by weight ___ 35
Vehicle composed of 20% dichlorodifluoromethane (Freon 12) and 80% 1,2-dichlor-1,1,2,2-tetrafluoroethane by weight, q.s.

This compositon is stable upon storage and effective for use.

EXAMPLE 2

Per 14.5 g. of product

Dexamethasone phosphate (present as the disodium salt) ___mg__ 20.7
Isoproterenol sulfate ___mg__ 20.7
Ethanol, absolute ___mg__ 290.0
Sodium sulfate ___mg__ 10.875
Trichlorofluoromethane, percent by weight ___ 15
Vehicle composed of 30% of dichlorodifluoro methane (Freon 12) and 70% of 1,2-dichloro-1,1,2,2-tetrafluoroethane by weight, q.s.

This composition was used to fill 5,500 aerosol containers. Samples taken from the total contaner at the time of filling were analyzed and gave the following results:

| Dexamethasone phosphate, mg./g. | Isoproterenol sulfate, mg./g. |
|---|---|
| 1.30 | 1.39 |
| 1.40 | 1.37 |
| 1.39 | 1.40 |
| 1.38 | 1.41 |
| 1.39 | 1.44 |
| 1.31 | 1.39 |
| [1] 1.36 | [1] 1.40 |

[1] Average.

Tests for stability on the total container after six weeks at 50° F. gave the following:

| Dexamethasone phosphate, mg./g. | Isoproterenol sulfate, mg./g. |
|---|---|
| 1.503 | 1.563 |
| 1.578 | 1.554 |
| [1] 1.541 | [1] 1.558 |
| [2] 113.3 | [2] 111.3 |

[1] Average.
[2] Percent of initial.

UNIFORMITY OF DELIVERY AT THE TIME OF FILLING

| Dexamethasone phosphate | Isoproterenol sulfate |
|---|---|
| Container 1: | Container 1: |
| +3.7% | +2.5% |
| −4.3% | −3.0% |
| Container 2: | Container 2: |
| +4.7% | +1.9% |
| −8.0% | −1.9% |

The above percentages represent the percent deviation from the average for each container tested.

AEROSOL TESTS AT THE END OF SIX WEEKS

| Dexamethasone phosphate | |
|---|---|
| Percent | Percent |
| 31.9 | 32.3 |
| 33.1 | 35.7 |
| 32.1 | 32.9 |
| 32.5 | 33.7 |
| 32.1 | 31.3 |
| [1] 32.8 | |

[1] Average.

The above percentages represent the percent of particles ranging in size between 0.5 to 4 microns recovered on slides 3 to 6 of the Cascade Impactor (Battelle Memorial Institute, Columbus, Ohio).

EXAMPLE 3

Per 14.5 g. of product

Dexamethasone phosphate (present as the disodium salt) ___mg__ 20.7
Isoproterenol sulfate ___mg__ 20.7
Ethanol, absolute ___mg__ 290
Sodium sulfate ___mg__ 10.875
Trichlorofluoromethane (Freon 11), percent by weight ___ 35
Vehicle composed of 30% of dichlorodifluoromethane (Freon 12) and 70% of 1,2-dichloro-1,1,2,2-tetrafluoroethane (Freon 114) by weight, q.s.

150 aerosol containers were filled with this composition and the following data were obtained:

TOTAL CONTAINER AT THE TIME OF FILLING

| Dexamethasone phosphate, mg./g. | Isoproterenol sulfate, mg./g. |
|---|---|
| 1.55 | 1.36 |
| 1.53 | 1.37 |
| 1.41 | 1.36 |
| 1.47 | 1.35 |
| 1.38 | 1.35 |
| 1.68 | 1.33 |
| [1] 1.50 | [1] 1.35 |

[1] Average.

STABILITY—TOTAL CONTAINER TEST AFTER STORAGE AT TEMPERATURE AND LENGTH OF TIME GIVEN

| Months | Temperature ° F. | Percent of Initial Concentration [1] | |
|---|---|---|---|
| | | Dexamethasone phosphate | Isoproterenol sulfate |
| 1 | 50 | 100 | 102 |
| 2 | 50 | 98 | 102.9 |
| 2 | 37 | 102 | 104.3 |
| 3 | 50 | 59 | 107 |
| 3 | 37 | 98 | 108 |
| 3 | [2] R.T | 101.3 | 107.4 |

[1] Percentages based on average of analysis of two containers.
[2] R.T. is ambient (or room) temperature.

UNIFORMITY OF DELIVERY

| Months | Dexamethasone phosphate | | Isoproterenol sulfate | |
|---|---|---|---|---|
| | Container 1, percent | Container 2, percent | Container 1, percent | Container 2, percent |
| 0 | [1] +8.6 / −3.9 | +2.0 / −2.0 | +5.8 / −6.6 | +3.0 / −1.5 |
| 1 | +7.4 / −7.9 | +3.4 / −3.4 | +3.6 / −3.6 | +6.2 / −4.9 |
| 3 | +7.9 / −3.3 | +9.2 / −4.6 | +8.7 / −2.9 | +8.6 / +4.3 |

[1] Percent deviation from the average for each container tested.

AEROSOL TEST
[Particle Size]

| | Dexamethasone Phosphate, percent | Isoproterenol Sulfate, percent |
|---|---|---|
| As initially filled: | | |
| Container 1 | [1] 21.6 | 19.7 |
| Container 2 | 21.7 | 20.2 |
| 10 Weeks post filling: | | |
| Container 1 | 28.7 | |
| Container 2 | 28.5 | |

[1] Percent of particles ranging in size between 0.5 to 4 microns on slides 3 to 6 of the Cascade Impactor.

The above tables demonstrate this composition remained stable notwithstanding the absences of sorbitan trioleate.

EXAMPLE 4

Per 12.6 g. of product

Dexamethasone phosphate (present as the sodium salt) _____ mg__ 18
Isoproterenol sulfate _____ mg__ 18
Trichlorofluoromethane (Freon 11), percent by weight _____ 35
Vehicle composed of 20% of dichlorodifluoromethane (Freon 12) and 50% of 1,2-dichloro 1,1,2,2-tetrafluoroethane (Freon 114) by weight, q.s.

This is a satisfactory stable composition.

EXAMPLE 5

Per 12.6 g. of product

Salt of dexamethasone phosphate disodium salt and isoproterenol sulfate having a particle size about 4 microns _____ mg__ 36
Trichlorofluoromethane (Freon 11), percent by weight _____ 35
Vehicle composed of 20% dichlorodifluoromethane (Freon 12) and 80% 1,2-dichloro-1,1,2,2-tetrafluoroethane (Freon 114) by weight, q.s.

This product is stable but has nothing to recommend it over the addition of the dexamethasone phosphate and isoproterenol sulfate as separate ingredients.

EXAMPLE 6

Per 14.5 g. of product

Dexamethasone phosphate (present as the disodium salt) _____ mg__ 20.7
Isoproterenol sulfate _____ mg__ 20.7
Trichlorofluoromethane (Freon 11), percent by weight _____ 50
Vehicle composed of 65% Freon 12 and 35% Freon 114 by weight, q.s.

Based upon experience to date, the composition of Example 3 is preferred.

All percentages given herein are percentages by weight.

In view of my invention and disclosure, variations and modifications to meet particular need will doubtless become evident to others skilled in the art to obtain all or part of the benefits of my invention without copying the composition shown, and I, therefore, claim all such insofar as they fall within the reasonable spirit and scope of my claims.

Having thus described my invention, what I claim as new and desire to secure by Letters Patent is:

1. An aerosol composition consisting by weight of from 0.01 to 1% of an anti-inflammatory steroid, from 0.01 to 1% of isoproterenol sulfate, from 0 to 5% of ethanol, from 5 to 50% of trichlorofluoromethane, from 0 to 0.1% of sodium sulfate, and the remainder being a propellant selected from the group consisting of dichlorodifluoromethane, 1,2-dichloro-1,1,2,2-tetrafluoroethane and their mixtures.

2. The composition according to claim 1 in which the anti-inflammatory steroid is dexamethasone phosphate.

3. The composition according to claim 1 in which the propellant is from 20 to 50% of dichlorodifluoromethane and 50 to 80% of 1,2-dichloro-1,1,2,2-tetrafluoroethane.

4. The composition according to claim 1 in which the anti-inflammatory steroid is about 0.14% of dexamethasone phosphate and the isoproterenol sulfate amounts to about 0.14%.

5. The composition according to claim 1 which contains from 0.05 to 0.1% of sodium sulfate.

6. The composition of claim 1 which contains about 2% of ethanol.

No references cited.

ALBERT T. MEYERS, *Primary Examiner.*

S. SINGER, *Assistant Examiner.*